(12) United States Patent
Sugimura et al.

(10) Patent No.: US 7,598,864 B2
(45) Date of Patent: *Oct. 6, 2009

(54) IC CHIP FOR IDENTIFICATION, METHOD FOR READING OUT DATA THEREFROM, AND METHOD FOR WRITING DATA THEREINTO

(75) Inventors: Shiro Sugimura, Kanazawa (JP); Hideki Kobayashi, Kanazawa (JP); Shuhei Taniguchi, Nomi (JP)

(73) Assignees: FEC Co., Ltd., Utsugi-machi, Kanazawa-shi, Ishikawa-ken (JP); The Government of Malaysia, Putrajaya (MY)

(*) Notice: Subject to any disclaimer, the term of this patent is extended or adjusted under 35 U.S.C. 154(b) by 575 days.

This patent is subject to a terminal disclaimer.

(21) Appl. No.: 11/138,103

(22) Filed: May 26, 2005

(65) Prior Publication Data
US 2005/0206504 A1 Sep. 22, 2005

(30) Foreign Application Priority Data
Dec. 3, 2003 (JP) ............ P 2003-404991

(51) Int. Cl.
*G08B 13/14* (2006.01)
*H04Q 5/22* (2006.01)
*G06K 19/06* (2006.01)

(52) U.S. Cl. ............ 340/572.1; 340/572.4; 340/10.5; 340/10.51; 340/10.52; 235/492

(58) Field of Classification Search ............ 340/572.1, 340/572.4, 10.5, 10.51, 10.52; 235/492
See application file for complete search history.

(56) References Cited

U.S. PATENT DOCUMENTS

| | | | | |
|---|---|---|---|---|
| 5,134,277 A | * | 7/1992 | Yerbury et al. | 250/214 RC |
| 5,345,231 A | * | 9/1994 | Koo et al. | 340/870.31 |
| 5,354,979 A | * | 10/1994 | Adelson et al. | 235/491 |
| 5,532,686 A | * | 7/1996 | Urbas et al. | 340/10.51 |
| 5,557,280 A | | 9/1996 | Marsh et al. | |
| 5,874,724 A | | 2/1999 | Cato et al. | |

(Continued)

FOREIGN PATENT DOCUMENTS

DE 41 15 730 12/1991

(Continued)

OTHER PUBLICATIONS

Office Action (with translation) of Chinese Application No. 200510073327.2 citing the attached documents (9 pages), Date: Nov. 2, 2007.

*Primary Examiner*—Daniel Wu
*Assistant Examiner*—Fekadeselassie Girma
(74) *Attorney, Agent, or Firm*—J. Harold Nissen; Lackenbach Siegel, LLP

(57) ABSTRACT

In order to eliminate limitation upon the frequency of a carrier wave from externally, this IC chip for identification includes: a power supply section which receives this carrier wave from outside and creates an internal power supply; a clock signal generation section for read out which generates an internal clock signal for read out based upon a clock signal pulse which is superimposed upon an optical signal from externally; a memory section; and an output section which serially reads out data in the memory section according to the internal clock signal for read out, and load modulates the carrier wave from outside based thereupon.

7 Claims, 4 Drawing Sheets

U.S. PATENT DOCUMENTS

| | | | |
|---|---|---|---|
| 6,542,083 B1 * | 4/2003 | Richley et al. | 340/825.49 |
| 6,570,490 B1 * | 5/2003 | Saitoh et al. | 340/10.1 |
| 6,725,014 B1 * | 4/2004 | Voegele | 455/41.2 |
| 2003/0128746 A1 * | 7/2003 | Lerner et al. | 375/148 |
| 2005/0023476 A1 * | 2/2005 | Haas et al. | 250/370.11 |
| 2005/0056703 A1 | 3/2005 | Sugimura et al. | |
| 2006/0103535 A1 * | 5/2006 | Pahlaven et al. | 340/572.1 |
| 2006/0273902 A1 * | 12/2006 | Shafer et al. | 340/572.1 |

FOREIGN PATENT DOCUMENTS

| | | |
|---|---|---|
| EP | 0324564 | 7/1989 |
| JP | 04287526 A * | 10/1992 |
| JP | H05-143792 | 6/1993 |
| JP | 10145443 | 5/1998 |
| JP | H11-074938 | 3/1999 |
| JP | 2000022649 A * | 1/2000 |
| JP | 2001-028037 | 1/2001 |
| JP | 2001-283164 | 10/2001 |
| JP | 2003218624 | 7/2003 |
| JP | 2003218624 A * | 7/2003 |
| WO | WO 88/04453 | 6/1988 |

* cited by examiner

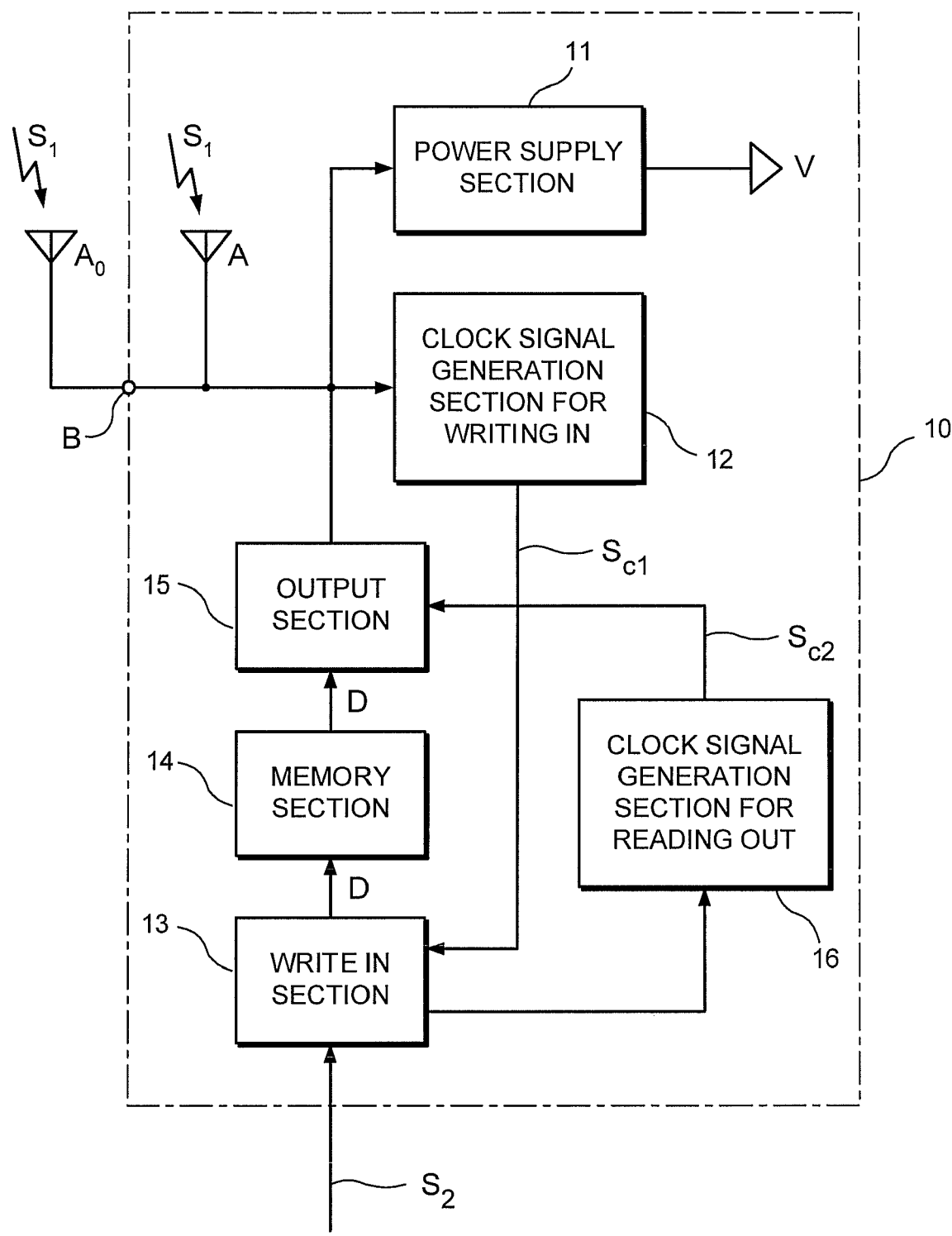
F I G. 1

IC CHIP FOR IDENTIFICATION, METHOD FOR READING OUT DATA THEREFROM, AND METHOD FOR WRITING DATA THEREINTO

BACKGROUND OF THE INVENTION

1. Field of the Invention

The present invention relates to a wireless type IC chip for identification, for identifying various types of goods or persons or the like, and to a method for reading out data therefrom and a method for writing data thereinto.

2. Description of Related Art

It is a common practice to issue various IC cards or IC tags in order to identify various types of goods or people or the like. An IC card or an IC tag may be of the contact type or of the non-contact type, but the non-contact type, in which a wireless type IC chip for identification is included, is superior from the point of view of convenience during use. It should be understood that a wireless type IC chip, in addition to being included in an IC card or an IC tag, is also sometimes directly included in various types of product, such as bank notes or the like, so as to serve for identifying the product.

In order to operate its internal electronic circuitry, a prior art wireless type IC chip for identification is supplied with electrical power by taking advantage of a carrier wave from the outside (for example, refer to Patent Document Japanese Patent Laying Open Publication Heisei 10-145443). In other words, when a carrier wave from an external reader-writer is received via an on-chip antenna, along with rectifying this carrier wave so as to generate an internal power supply therefrom, data which is superimposed upon the carrier wave is also read in, so that it is possible to dispatch the necessary data by wireless.

Since, according to the above described prior art, in addition to the carrier wave from the outside serving for generation of the internal power supply for the IC chip, it is also employed as a carrier wave upon which data is superimposed, accordingly, in order accurately to demodulate the data which is thus superimposed, it is necessary to maintain the frequency of the carrier wave fixed, and thus the problem arises that the range of application becomes rather limited. In other words this is because, when the frequency of the carrier wave is fixed, it is necessary to make the characteristics of the on-chip antenna be adjusted and set so as to correspond accurately to each type of goods to which the IC chip is to be assembled, since the characteristics of the on-chip antenna which is provided upon the IC chip are influenced by the nature and the properties of the goods.

SUMMARY OF THE INVENTION

The present invention has been conceived in the light of the above described problems with the prior art, and its objective is to provide an IC chip for identification, and a method for reading out data and writing in data therefrom, which, by employing a carrier wave upon which only a clock signal pulse is superimposed, can eliminate any intrinsic limitation upon the frequency of the carrier wave, and which thus can be applied extremely widely.

In order to achieve this objective, according to its essential features, the first aspect of the present invention provides an IC chip for identification, comprises: a power supply section which takes advantage of a carrier wave from outside to create an internal electrical current; a clock signal generation section for read out which generates an internal clock signal for read out based upon a clock signal pulse which is superimposed upon an optical signal from outside; a memory section; and an output section which serially reads out data in said memory section according to said internal clock signal for read out, and load modulates said carrier wave based thereupon.

It should be understood that it is possible to provide a generation section for a clock signal for writing in which generates an internal clock signal for writing in based upon a clock signal pulse which is superimposed upon said carrier wave, and a write in section which serially reads in data which is superimposed upon said optical signal according to said internal clock signal for writing in, and stores it in said memory section; and that it is also possible for the write in section to detect overflow of said data, and to block said memory section so that writing in to it becomes impossible.

Furthermore, the generation section for a clock signal for writing in may discriminate a clock signal pulse which is superimposed upon said carrier wave, and there may be included, upon an on-chip antenna which is connected to said output section, a bump contact which is connected to an external antenna.

And moreover, according to its essential features, the second aspect of the present invention provides a method for reading out data from an IC chip for identification, wherein:

an internal clock signal for read out is generated based upon a clock signal pulse which is superimposed upon an optical signal from outside; and data which is stored in a memory section is serially read out according to said internal clock signal for read out, and said carrier wave from outside is load modulated based thereupon.

Yet further, according to its essential features, the third aspect of the present invention provides a method for writing in data to an IC chip for identification, wherein: an internal clock signal for writing in is generated based upon a clock signal pulse which is superimposed upon a carrier wave from outside; data which is superimposed upon an optical signal from outside is serially stored according to said internal clock signal for writing in; and the data which has been stored is written into a memory section, and said memory section is blocked so that writing in to it becomes impossible.

According to the structure of the first aspect of the present invention as described above, the power supply section generates an internal power supply by taking advantage of the carrier wave from the outside, and the clock signal generation section for read out generates an internal clock signal for read out based upon the clock signal pulse which is superimposed upon the optical signal from the outside. On the other hand, the output section reads out the data which is stored in the memory section serially, according to the internal clock signal for read out, and load modulates the carrier wave. Thus, the external reader-writer which generates the carrier wave is able to read in the data from the memory section via the carrier wave, and, at this time, both the IC chip for identification and the reader-writer do not in any way depend upon the frequency of the carrier wave. In other words, the carrier wave is a simple carrier wave upon which the clock signal pulse is superimposed, and is only a supply of electrical power for the internal power supply, so that its frequency is not intrinsically limited.

By the write in section reading in the data which is imposed upon the optical signal from outside serially, and storing it in the memory section, it is possible to write predetermined data into the memory section and to store it therein. It should be understood that the data in the optical signal at this time is supposed to be synchronized with the clock signal pulse which is superimposed upon the carrier wave. This is because the clock signal pulse becomes the basis for the internal clock signal for writing in, and determines the standard timing when reading in the data in the optical signal.

The write in section is able to prohibit further additional writing in and to prevent alteration of the data in the memory section, by detecting overflow of the data which is superimposed upon the optical signal, and by blocking the memory section so that further writing in to it becomes impossible. It should be understood that, as a means for making it impossible to write further data into the memory section, a preliminary gate circuit may be provided for the shift register which reads in the optical signal, so block it off in a hardware manner by closing; or the non volatile memory which is used as the memory section may be implemented as a fuse memory, and this fuse memory may be blocked so that further writing in to it becomes impossible on a hardware basis; or both of these expedients may be employed. It should be understood that, with the former method, as the non volatile memory which was used in the memory section, it would also be possible to employ, for example, a flash memory which was capable of being rewritten.

By discriminating the clock signal pulses which are imposed upon the carrier wave, the generation section for the clock signal for writing in is able to enhance the tolerance for noise. It should be understood that this discrimination of the clock signal pulses may use, for example, a narrow band pass filter which extracts only the frequency component which corresponds to the clock signal pulses.

If a bump contact is provided to the on-chip antenna for connection of an external antenna, then it is possible easily to enhance the characteristics of the on-chip antenna with the external antenna, and, by increasing the communication distance of this IC chip for identification, it is possible to widen the scope of application by a further level.

And it is possible to implement the operation of the clock signal generation section for read out, the memory section, and the output section of the first aspect of the present invention according to the second aspect of the present invention as described above; and, moreover, it is possible to implement the operation of the generation section for the clock signal for writing in, the memory section, and the write in section of the first aspect of the present invention according to the third aspect of the present invention as described above.

BRIEF DESCRIPTION OF THE DRAWINGS

FIG. 1 is a system block diagram showing the overall system structure of an embodiment of the IC chip for identification according to the present invention.

DETAILED DESCRIPTION OF THE INVENTION

Figure 2:
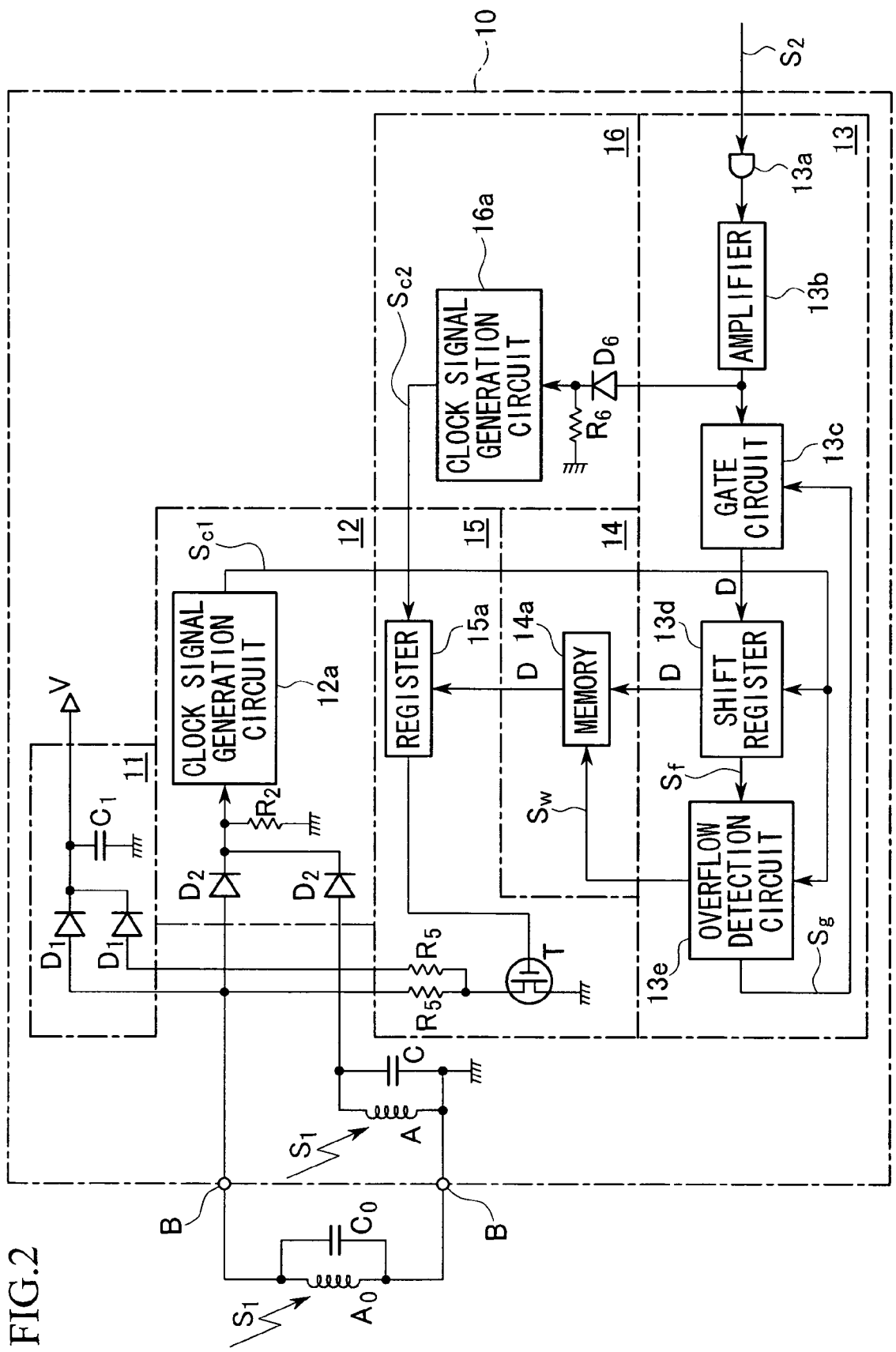
FIG. 2 is a more detailed system block diagram of the same.

In the following, a preferred embodiment of the present invention will be explained in detail with reference to the drawings.

Referring to FIG. 1, an IC chip for identification 10 is of a wireless type, and comprises a power supply section 11, clock signal generation sections 12 and 16 for writing in and reading out, a write in section 13, a memory section 14, and an output section 15.

The power supply section 11, the input side of the clock signal generation section 12 for writing in, and the output side of the output section 15 are each connected in common to an on-chip antenna A. It should be understood that a bump contact B is provided for connecting an external antenna $A_0$ to this on-chip antenna A. It is supposed that a carrier wave SI from a reader-writer which is not shown in the drawings arrives at the on-chip antenna A and the external antenna $A_0$.

The output of the power supply section 11 is supplied as an internal power supply V to the various parts within the IC chip 10.

The output of the clock signal generation section 12 for writing in is inputted to the write in section 13 as an internal clock signal Sc1 for writing in. One of the outputs of the write in section 13 is inputted via the clock signal generation section 16 for read out to the output section 15 as an internal clock signal Sc2 for read out, and its other output is connected via the memory section 14 to the output section 15. It is supposed that an optical signal S2 from an external reader-writer which is not shown in the figures arrives at the write in section 13.

Referring to FIG. 2, a capacitor C for resonance is connected in parallel with the on-chip antenna A, and one end of this on-chip antenna is grounded. It should be understood that it is possible to add and to connect an external antenna $A_0$ to the on-chip antenna A, via the bump contacts B, B for connection, and moreover a capacitor $C_0$ for resonance is connected in parallel with the external antenna $A_0$. However the one ends of the on-chip antenna A and of the external antenna $A_0$ on their non-grounded sides are individually led to the power supply section 11, to the clock signal generation section 12 for writing in, and to the output section 15.

Each of the one ends of the on-chip antenna A and of the external antenna $A_0$ on their non-grounded sides is connected in common to the power supply section 11 via diodes D1, D1 for rectification. A capacitor C1 for smoothing is connected to the output sides of the diodes D1, D1, and thus an internal power supply V is outputted.

Each of the one ends of the on-chip antenna A and of the external antenna $A_0$ on their non-grounded sides is connected in common to the clock signal generation section 12 for writing in via a diode D2, D2 for detection, and they are led to a clock signal generation circuit 12a. The input side of the clock signal generation circuit 12a is grounded via a resistor R2, and the output of the clock signal generation circuit 12a is conducted as an internal clock signal Sc1 for writing in to a shift register 13d of the write in section 13 and to an overflow detection circuit 13e.

The write in section 13 comprises an amplifier 13b, a gate circuit 13c, a shift register 13d, and an overflow circuit 13e, which are connected in that order to a light reception element 13a which receives the optical signal S2 from the external reader-writer. The output of the overflow detection circuit 13e is connected to the gate circuit 13c, as well as to a memory 14a of the memory section 14. It should be understood that the light reception element 13a is, for example, a photodiode.

The other output of the shift register 13d is connected to the memory 14a of the memory section 14, and the output of the memory 14a is connected to a register 15a of the output section 15. The output of the register 15a is connected to the gate of a switching element T such as, for example, a FET, and the cathode side of this switching element T is grounded, while its anode side is connected via individual resistors R5, R5 to one end of the non-grounded side of the on-chip antenna A and the external antenna $A_0$.

The output of the amplifier 13b of the write in section 13 is branched off and leads to the clock signal generation section 16 for read out, and is connected via a diode D6 for detection to a clock signal generation circuit 16a. It should be understood that the input side of this clock signal generation circuit 16a is grounded via a resistor R6, while its output side is inputted to the register 16a as the internal clock signal Sc2 for read out.

Figure 3A:
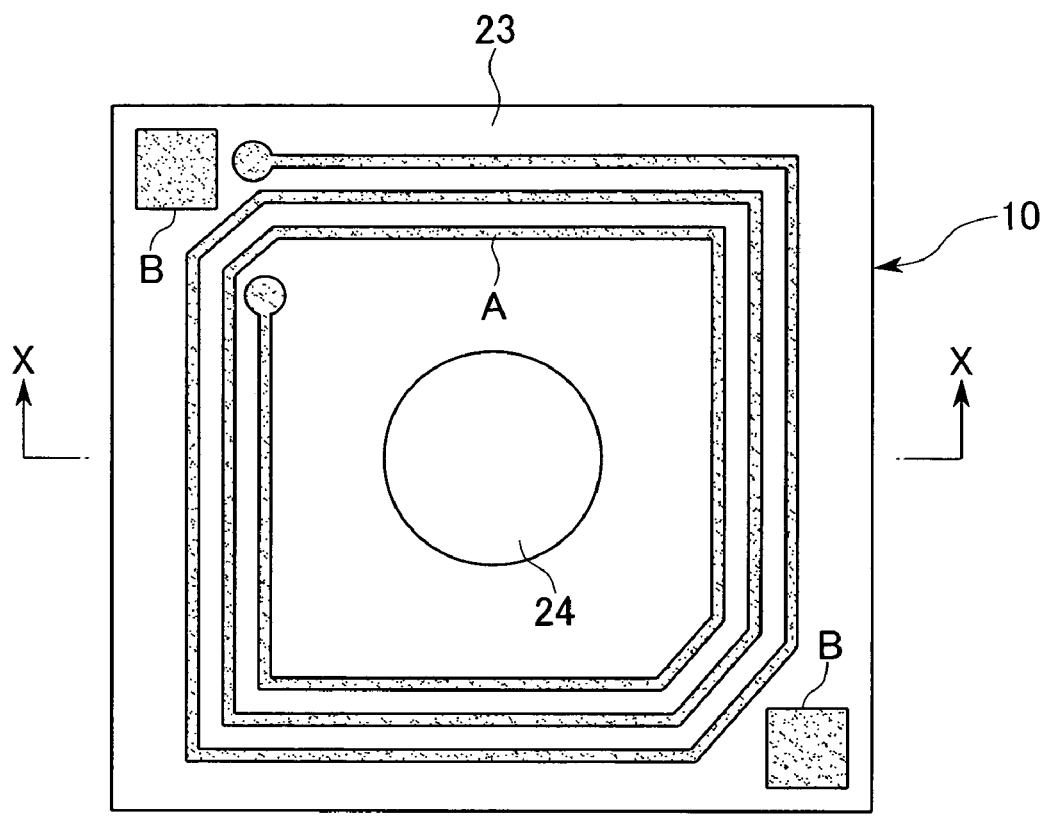
FIG. 3A is a schematic plan view showing the overall physical structure of this IC chip for identification.
Figure 3B:
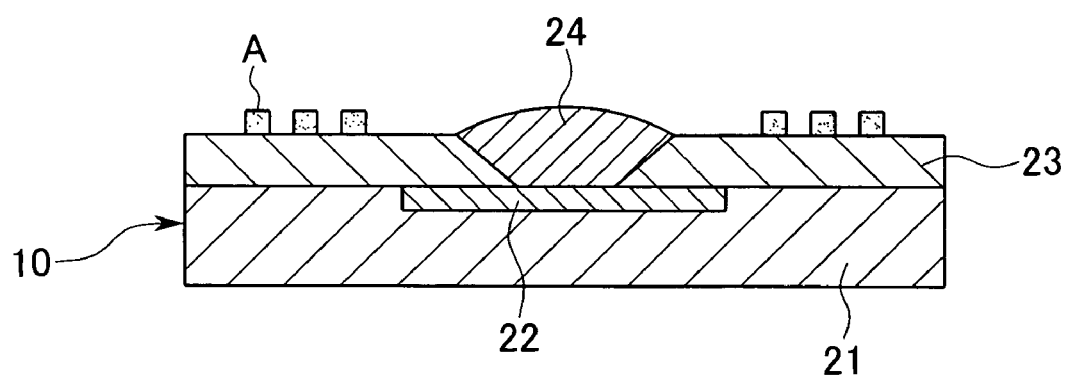
FIG. 3B is a sectional view thereof taken in a plane shown by the arrows X-X in FIG. 3A.

As shown in the plan view of FIG. 3A, this IC chip 10 may be manufactured as a silicon chip for example about 0.5 mm square. And FIG. 3B is a sectional view of this IC chip 10 taken in a plane shown by the arrows X-X in FIG. 3A.

This IC chip 10 is made by forming the required integrated circuit 22 upon a silicon base 21, by providing an insulating layer 23 which is made, for example, from polyimide over the upper surface of the silicon base 21, and by then forming the on-chip antenna A and the bump contacts B, B over this insulating layer 23. Here, by way of example, this on-chip antenna A is shown as being a loop antenna with three turns, which is suitable for a representative frequency band of 2.45 GHz for the carrier wave S1, and it is formed as a metallic plated layer over the insulating layer 23. Furthermore, a light conductive portion 24 which is shaped as a convex lens is formed in a portion of the insulating layer 23, in order to allow the optical signal S2 to arrive with good efficiency at the light reception element 13a which is provided in the integrated circuit 22.

The operation of this IC chip 10 is as follows.

Figure 4:
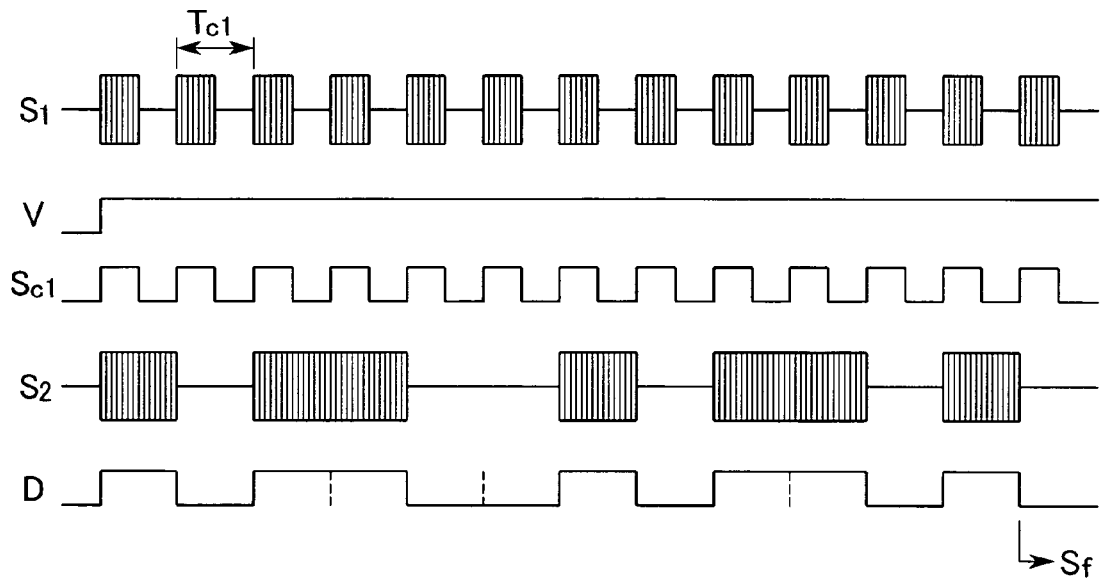
FIG. 4 is a first time chart showing the operation of this IC chip.

When no data is written into the memory 14a of the memory section 14, and when the carrier wave S1 upon which a clock signal pulse is superimposed arrives from an external reader-writer at one or both of the on-chip antenna A and the external antenna $A_0$ (refer to FIG. 4), then the power supply section 11 is able to create an internal power supply V by rectifying this carrier wave S1 via the diodes D1, D1. It should be understood that this carrier wave S1 is of a frequency of around 10 MHz ~70 GHz, and upon it, by 100% ASK modulation, there is superimposed a clock signal pulse of, for example, a clock signal frequency fc1=1/Tc1=100 kHz. Here, Tc1 is the period of this clock signal pulse; and it would also be acceptable for it to be superimposed upon the carrier wave S1 by FSK modulation, PSK modulation, or the like, instead of ASK modulation. On the other hand, the clock signal generation circuit 12a of the clock signal generation section 12 for writing in detects this carrier wave S1 via the diodes D2, D2, and is able to generate an internal clock signal Sc1 for writing in based upon the above clock signal pulse which is superimposed upon the carrier wave S1.

Next, an optical signal S2 upon which data D is superimposed is inputted to the optical reception element 13a of the write in section 13 from the external reader-writer. Here, this optical signal S2 is desirably an infra-red beam of sub-carrier frequency 500 kHz or higher, and the data D which is superimposed upon this optical signal S2 is supposed to be synchronized with the clock signal pulses which are superimposed upon the carrier wave S1. The data D is read in to the shift register 13d serially via the amplifier 13b and the gate circuit 13c of the write in section 13, according to the internal clock signal Sc1 for writing in, and is stored. This is because the shift register 13d operates according to the internal clock signal Sc1 for writing in.

When the shift register 13d stores a predetermined amount of the data D, it generates an overflow signal Sf. When this happens, the overflow detection circuit 13e dispatches a write in signal Sw to the memory 14a of the memory section 14, and, along with the data D within the shift register 13d being written into the memory 14a and stored, a gate signal Sg is dispatched to the gate circuit 13c, and the gate circuit 13c closes, so that it is possible to prevent the further passage of data D. In other words, via the gate circuit 13c, the memory 14a of the memory section 14 performs a blocking action, so that further writing in becomes impossible. It should be understood that the memory 14a is a non volatile type memory, so that the internal data D is held and maintained just as it is, even if the carrier wave S1 from the outside is lost and the internal power supply V is cut off and lost.

Figure 5:
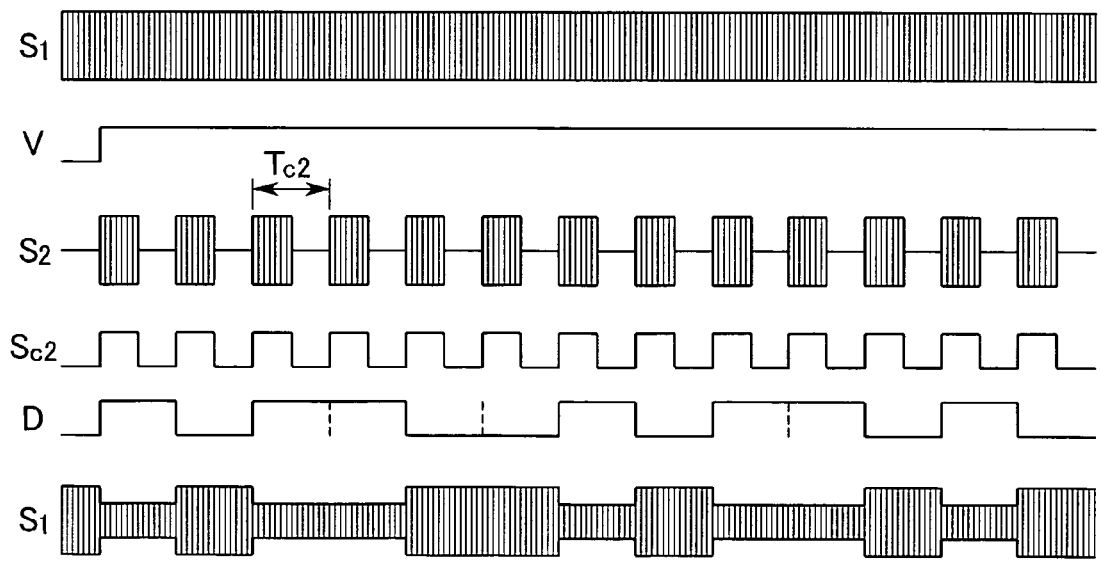
FIG. 5 is a second time chart showing the operation of this IC chip.

Referring to FIG. 5, when the carrier wave S1 from the outside arrives at the on-chip antenna A and/or the external antenna $A_0$, and, at the same time, an optical signal S2, upon which is superimposed a clock signal pulse of clock signal frequency fc2=1/Tc2, arrives at the light reception element 13a of the write in section 13, then the register 15a of the output section 15 reads out serially the data D in the memory 14a according to the internal clock signal Sc2 for read out from the clock signal generation circuit 16a, and opens and closes the switching element T according to this data D. Here, Tc2 is the period of this clock signal pulse, and the clock signal generation circuit 16a is able to generate the internal clock signal Sc2 for read out based upon the clock signal pulse which is superimposed upon the optical signal S2. On the other hand, the switching element T changes the load impedance of the on-chip antenna A and of the external antenna $A_0$ via the resistors R5, R5, and load modulates the carrier wave S1 according to the data D (refer to the lowest level of FIG. 5). Thus, the reader-writer which generates the carrier wave S1 and the optical signal S2 is able to read in the data D in the memory 14a via the carrier wave S1.

In the above explanation, according to requirements, the external antenna $A_0$ may be employed. In this connection, if only the on-chip antenna A is employed, the frequency of the carrier wave S1 comes to be limited to the vicinity of the resonance frequency of the on-chip antenna A, but the reader-writer may be made so as, at this time, to sweep the frequency of the carrier wave S1, and so as to implement writing in and reading out of the data D at the most suitable frequency.

Furthermore, it is possible to endow the clock signal generation circuit 12a of the clock signal generation section for writing in 12 with a discrimination function for the clock signal pulse. The internal clock signal Sc1 for writing in is generated only for a clock signal pulse of a specified clock signal frequency fc1 which is superimposed upon the carrier wave S1, so that it is possible to enhance the amount of noise which can be tolerated. By endowing the clock signal generation circuit 16a of the clock signal generation section for read out 16 with a discrimination function for the clock signal pulse in exactly the same manner, it is possible to generate the internal clock signal Sc2 for read out only for the clock signal pulse of the clock signal frequency fc2. It should be understood that, when the clock signal pulse is superimposed upon the carrier wave S1 by ASK modulation, it is possible to set the amount of modulation of the carrier wave S1 to any desired range from 10% to 100%; and it is desirable to set it to a low amount of modulation, provided that it is possible to implement a predetermined noise toleration characteristic. This is because it enables the capacity of the capacitor C1 for smoothing of the power supply section 11 to be made small.

The gate circuit 13c may, for example, be provided with a fuse (not shown in the drawings) which is blown by the gate signal Sg, so that the gate circuit 13c is closed in a hardware manner by this fuse being blown by the gate signal Sg; and, in this case, the structure will be such that the gate circuit 13c cannot again be opened. Since, at this time, the memory 14a is securely blocked by the gate circuit 13c, it will be acceptable for it to be a flash memory which, per se, can be rewritten. However, for the memory 14a, it is desirable to employ a flash memory which cannot be rewritten, or a fused memory, so that modification of the data which is stored therein cannot occur. While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An IC chip for identification, comprising:
   an antenna which receives an external carrier wave;
   a power supply section which takes advantage of said external carrier wave to create an internal electrical current;
   a light reception element which receives an external optical signal upon which a clock signal pulse is superimposed;
   a clock signal generation section for read-out which generates an internal clock signal for read-out based upon said clock signal pulse;
   a memory section; and
   an output section which serially reads-out data in said memory section according to said internal clock signal for read-out, and load modulates said external carrier wave based thereupon.

2. An IC chip for identification as described in claim 1, further comprising a clock signal generation section for writing-in which generates an internal clock signal for writing-in based upon a clock signal pulse that is superimposed upon said carrier wave, and a write-in section which serially reads in data which is superimposed upon said external optical signal according to said generated internal clock signal for writing-in, and stores said data in said memory section.

3. An IC chip for identification as described in claim 2, wherein said write-in section detects overflow of said data, and blocks said memory section so that writing in to said memory section becomes impossible.

4. An IC chip for identification as described in claim 3, wherein said clock signal generation section for writing-in discriminates said clock signal pulse which is superimposed upon said carrier wave.

5. An IC chip for identification as described in claim 1, wherein said antenna is an on-chip antenna, and said IC chip further comprises, upon said on-chip antenna which is connected to said output section, a bump contact connected to an external antenna.

6. A method for reading out data from an IC chip for identification, including:
   receiving an external carrier wave;
   creating an internal electrical current by taking advantage of said external carrier wave;
   receiving an external optical signal upon which a clock signal pulse is superimposed;
   generating an internal clock signal for read-out based upon said clock signal pulse; and
   serially reading out data which is stored in a memory section according to said internal clock signal for read-out, and load modulating said external carrier wave based thereupon.

7. A method for writing in data to an IC chip for identification, including:
   receiving an external carrier wave upon which a clock signal pulse is superimposed;
   creating an internal electrical current by taking advantage of said external carrier wave;
   generating an internal clock signal for writing-in based upon said clock signal pulse;
   receiving an external optical signal upon which data is superimposed;
   serially storing said data according to said internal clock signal for writing-in; and
   writing the data which has been stored into a memory section, and blocking said memory section so that any further writing-in into said memory section becomes impossible.

* * * * *